(12) United States Patent
Acker

(10) Patent No.: US 6,392,713 B1
(45) Date of Patent: May 21, 2002

(54) DIGITAL PROCESSING AMPLIFIER

(75) Inventor: David Edwin Acker, Newton, MA (US)

(73) Assignee: Media 100 Inc., Marlboro, MA (US)

(*) Notice: Subject to any disclaimer, the term of this patent is extended or adjusted under 35 U.S.C. 154(b) by 0 days.

(21) Appl. No.: 09/518,963

(22) Filed: Mar. 6, 2000

(51) Int. Cl.$^7$ ................................................. H04N 9/68
(52) U.S. Cl. ....................... 348/651; 348/639; 348/646; 348/673
(58) Field of Search ................................. 348/673, 703, 348/649–651, 659, 638, 639, 675, 453, 646

(56) References Cited

U.S. PATENT DOCUMENTS

| | | | |
|---|---|---|---|
| 3,711,636 A | 1/1973 | Janssen et al. ............ 178/5.4 R |
| 3,814,852 A | 6/1974 | Mierzwinski ......... 178/7.5 DC |
| 4,152,721 A | 5/1979 | Kim ............................ 358/27 |
| 4,183,046 A | 1/1980 | Dalke et al. ................. 358/22 |
| 4,355,327 A | 10/1982 | Nagumo et al. ............. 358/44 |
| 4,506,287 A | 3/1985 | Yamanaka et al. ........ 358/21 R |
| 4,523,223 A | * 6/1985 | Luder et al. .................. 358/27 |
| 4,555,768 A | * 11/1985 | Lewis, Jr. et al. .......... 364/757 |
| 4,562,459 A | 12/1985 | Sokei .......................... 358/27 |
| 4,568,967 A | 2/1986 | Freyberger et al. ............. 358/27 |
| 4,742,387 A | 5/1988 | Oshima ....................... 358/29 |
| 4,805,016 A | 2/1989 | Kato ........................... 358/98 |
| 4,819,060 A | 4/1989 | Minema et al. ............... 358/29 |
| 4,847,679 A | 7/1989 | Ohtsuki ....................... 358/27 |
| 4,876,589 A | 10/1989 | Orsburn et al. .............. 358/22 |
| 5,140,410 A | 8/1992 | Shin ........................... 358/31 |
| 5,333,070 A | 7/1994 | Ichikawa .................... 358/518 |
| 5,392,074 A | 2/1995 | Watanabe et al. ........... 348/647 |
| 5,555,031 A | 9/1996 | Van Roij .................... 348/645 |
| 5,619,280 A | 4/1997 | Yamashita et al. .......... 348/645 |
| 5,703,660 A | 12/1997 | Hankinson et al. ......... 348/638 |
| 5,712,683 A | 1/1998 | Nakai et al. ................ 348/256 |
| 5,757,439 A | 5/1998 | Kim ........................... 348/645 |

OTHER PUBLICATIONS

"Video Demystified", Chapter 9/Video Processing, p. 422.
Copy of Written Opinion PCT/US01/40251.

* cited by examiner

*Primary Examiner*—Victor R. Kostak
(74) *Attorney, Agent, or Firm*—Fish & Richardson P.C.

(57) ABSTRACT

A procamp to color transforms component digital video data. The procamp includes a digital multiplier coupled to receive component digital video data corresponding to at least two different pixel parameters. The digital multiplier is configured to selectively multiply the component video data for different pixel parameters by different factors.

12 Claims, 5 Drawing Sheets

DIGITAL PROCESSING AMPLIFIER

BACKGROUND

The invention relates to processing component digital video data.

Many component video models define a pixel as a combination of three pixel parameters. In one model, the pixel parameters include a luminance Y, a first color difference signal CR, and a second color difference signal CB, the last two parameters also being referred to as "color data" herein. For this model, creating an image entails assigning values of Y, CR, and CB to each pixel of the image.

Often, video component assignments are subject to errors that affect an image globally. These global errors may produce incorrect values for the image's contrast, black-level, hue, or color saturation.

Errors may result from improper preparation, handling, and/or transmission of the image's data, or from particular light conditions or particular equipment. For example, offset errors in component video data can occur due to incorrect setting of signal levels, losses, or equipment drift. These types of errors can cause global video component errors in both component analog video data and component digital video data derived from analog data.

One way to correct a global video component error is to perform a transformation on the component video data. The transformation can be carried out by software, or by hardware in a processing amplifier also known as a "procamp." For the above-described color model, the correcting transformation changes the Y, CR, CB values of each affected pixel as follows:

$Y' = G_y Y + B$, $CR' = (G_C G_{CR} CR)\cos \phi - (G_C G_{CB} CB)\sin \phi$, $CB' = (G_C G_{CB} CB)\cos \phi + (G_C G_{CR} CR)\sin \phi$.

The values of the transformed pixel parameters Y', CR', CB' are given in terms of the original pixel parameters Y, CR, CB and the values of parameters defining the transformation. The parameters defining the transformation include factors such as the contrast and chrominance gains $G_Y$ and $G_C$, the color-difference saturation gains $G_{CR}$ and $G_{CB}$; a blackness offset B, and the hue rotation angle $\phi$. Jacks, Keith, *Video Demystified*, p. 422, describes carrying out this transformation with seven multiplication steps, which, if implemented in hardware, would require seven multipliers.

When such a color transformation is carried out, values for the contrast and chrominance gains $G_y$, $G_C$, the color difference saturation gains $G_{CR}$, $G_{CB}$, the blackness offset B, and the hue rotation angle $\phi$ must be provided. For example, the values of these parameters may be set manually by a user. If the component video data is digital, the procamp may perform color transformations digitally.

SUMMARY

In a first aspect, the invention provides a procamp to transform component digital video data. The procamp includes a digital multiplier coupled to receive component digital video data corresponding to at least two different pixel parameters. The digital multiplier is configured to selectively multiply the component video data for different pixel parameters by different factors.

In various embodiments, the procamp may further include a multiplexer having input terminals coupled to sources of the different factors and an output terminal coupled to the multiplier. The procamp may also include a controller coupled to cause the multiplexer to transmit first and second factors in response to component video data for first and second pixel parameters being received at the multiplier.

In some embodiments, the multiplier multiplies luminance and color difference data by luminance and color difference saturation gains, respectively. The multiplier may receive the gains from a multiplexer. The multiplexer transmits the luminance and saturation gains in response to respective luminance and color difference data being sent to the multiplier.

In some embodiments the digital multiplier multiplies CR and CB color difference data by the corresponding color difference saturation gains, respectively. The multiplier may receive the saturation gains from a multiplexer.

In some embodiments, the multiplier produces first and second new component video data by multiplying a color data portion of the received component video data by respective first and second hue factors. The hue factors are the sine of an angle and cosine of the angle.

The angle defines a hue rotation of the color data.

In some embodiments, the procamp includes a buffer coupled to receive the component digital video data and to transmit the received data to the digital multiplier.

In some embodiments, the procamp includes a second digital multiplier coupled to receive color data of the component video data produced by the first multiplier. The second digital multiplier is configured to produce first and second new color data by multiplying each color datum received from the first multiplier by the sine of an angle and the cosine of an angle, respectively. The angle defines a hue rotation of the color data. The procamp may include an adder coupled to receive the new color data and to produce color data with a new hue by adding the first and second new color data.

The procamp may include an adder to add a black-level offset to processed digital data and, a second digital multiplier coupled to receive the color data produced by the first multiplier.

The procamp may also include a separator coupled to receive the component video data from the first multiplier. The separator sends a portion of the data from the first multiplier to the adder in response to the data corresponding to a first pixel parameter. The separator sends a color data portion of the component video data received from the first multiplier to a second multiplier.

In a second aspect, the invention provides a method of transforming a sequence of component digital video data. The method includes receiving the sequence of the component video data, serially transmitting the received data to a digital multiplier, and multiplying each transmitted datum by a preselected factor in the multiplier. The component video data of the sequence corresponds to at least two different pixel parameters.

In some embodiments, the acts of multiplying produce products with at least two different gains. The acts of multiplying may multiply data corresponding to each particular pixel parameter with a gain assigned to the particular pixel parameter.

In some embodiments, the method includes temporally interleaving the two different gains to the multiplier to perform the acts of multiplying. The method may further include sending a portion of the sequence from the first digital multiplier to a second digital multiplier and producing first and second data components from each datum of the portion. The acts of producing use the second digital multiplier to multiply each sent datum by first and second new digital factors. The new digital factors are a sine and a cosine of an angle. The method may further include producing transformed digital color difference data by summing pairs of the produced data components.

In a third aspect, the invention provides a method of adjusting contrast and saturation levels of serially streaming component digital video data. The method includes receiving a sequence of the component digital video data, sequentially sending the data to a digital multiplier, and multiplying the component video data by contrast and saturation gains in the multiplier.

In some embodiments, the method includes temporally interleaving the contrast and saturation gains to the digital multiplier. These embodiments may include sending a portion of the data of the sequence from the first digital multiplier to a second digital multiplier. The second digital multiplier produces first and second digital data components from each datum of the portion by multiplying each sent datum by a sine of an angle and a cosine of the angle. The method may produce transformed digital color difference data by summing pairs of the produced data components.

Various embodiments provide inexpensive digital procamps that process sequentially transmitted component video data. These procamps use one digital multiplier to perform more than one of the multiplications involved in color transformations.

Other advantages and features of the invention will be apparent from the following description of preferred embodiments thereof and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

Features and advantages of the invention will be apparent from the following description taken together with the drawings in which.

DETAILED DESCRIPTION

The described embodiments color transform serially transmitted, component digital video data. The component video data has the 4:2:2 format and is transmitted according the ITU-R BT.656 as the sequence: Reference identifier, $CB_1, Y_1, CR_1, Y_2 \ldots$ at 27 Mega Hertz as 10-bit parallel data or 270 Mega Hertz as serial data. Other component video data (e.g., RGB) and transmission formats may be used by other embodiments.

Figure 1:
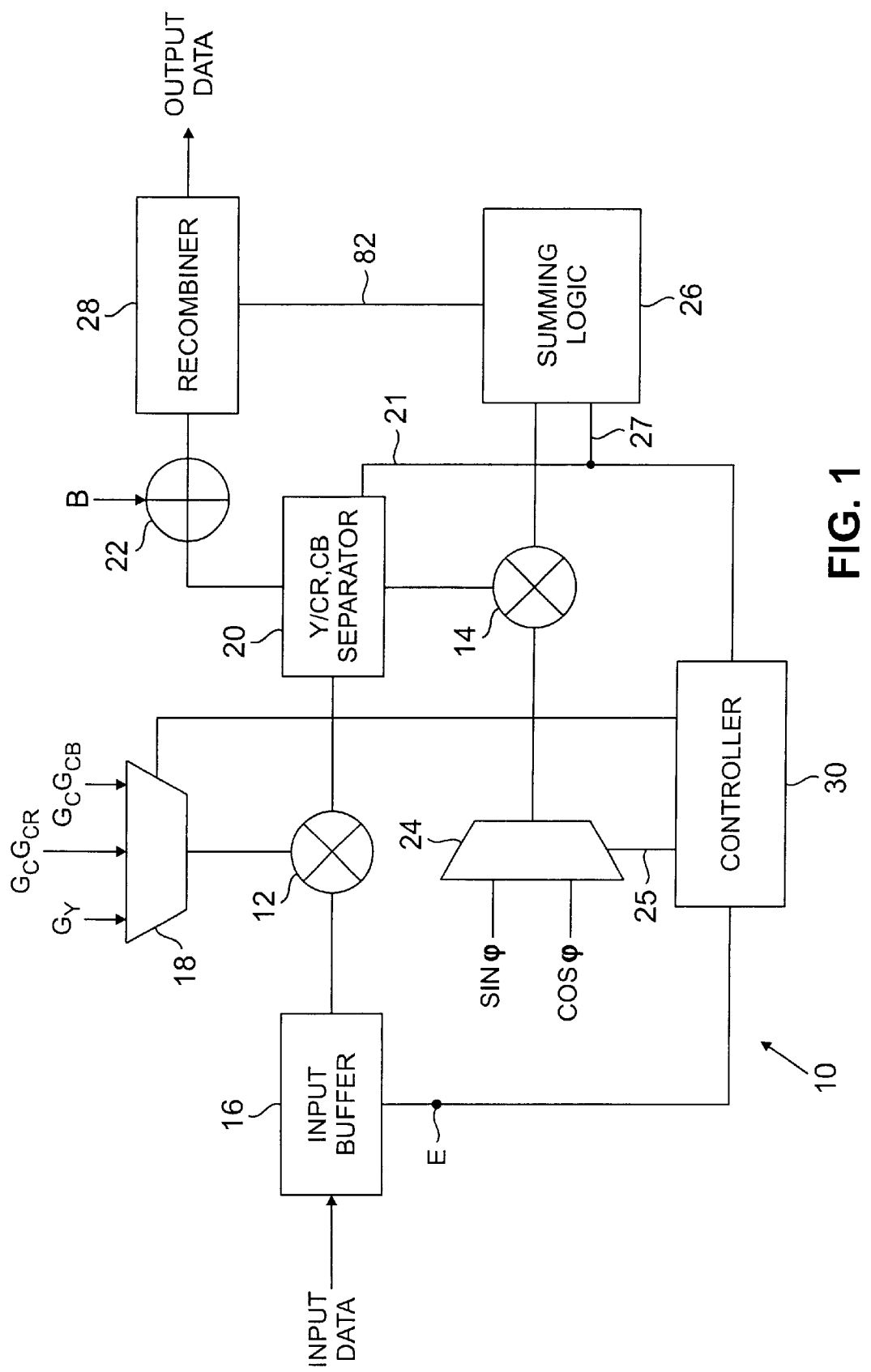
FIG. 1 is a circuit diagram for one embodiment of a digital procamp.

FIG. 1 shows one embodiment of a digital procamp 10. The procamp 10 includes an input buffer 16 for receiving streaming component video data. The procamp 10 has two digital multipliers 12, 14 that perform the parameter multiplications of the transformation. The multipliers 12, 14 are capable of multiplying signed and unsigned digital numbers. The procamp 10 has an adder 22 and summing logic 26 that perform additions of the transformation. The procamp 10 also includes a recombiner 28 that reorders the transformed data sequence, i.e., $CB_1', Y_1', CR_1', Y_2'. \ldots$, into the same order as the original sequence, i.e., $CB_1, Y_1, CR_1, Y_2 \ldots$, received by the input buffer 16.

The procamp 10 performs a series of algebraic operations on received component video data that are synchronized to the received data stream by a controller 30. The controller 30 receives timing information on newly arrived component video data from the buffer 16, or it may receive appropriate timing formats from an external source that is synchronized with the data stream. From the timing information, the controller 30 transmits control signals to multiplexers (MUX's) 18, 24, separator 20, summing logic 26, and recombiner 28. The control signals synchronize individual operations of the transformation to the received data stream.

The first MUX 18 transmits digital signals for the gains $G_Y$, $G_C G_{CR}$, and $G_C G_{CB}$ to the multiplier 12. The selection of which gains to transmit is fixed by control signals that the controller 30 sends to a select terminal 19. For the selected gains, the multiplier 12 produces the new quantities $YG_Y$, $CRG_C G_{CR}$, and $CBG_C G_{CB}$, which are referred to as rescaled component video data $Y^*$, $CR^*$, and $CB^*$.

The second multiplexer 24 transmits digital signals for the hue rotation factors $\sin \phi$ and $\cos \phi$ to the multiplier 14. The selection of which hue factors to transmit is fixed by control signals that the controller 30 sends to select terminal 25. The rotation factors are selected so that the second multiplier 14 produces the new sequence $CR^*\cos \phi$, $CR^*\sin \phi$, $CB^*\sin \phi$, $CB^*\cos \phi$ from the rescaled color data $CR^*$ and $CB^*$.

The separator 20 acts like a digital stream decoder (demultiplexer) that separates received signals into two groups composed of the rescaled luminances $G_Y Y$ and the rescaled color differences $G_C G_{CR} CR$ and $G_C G_{CB} CB$, also referred to as "color data." The separator 20 sends signals for $G_Y Y$ to the adder 22 and sends signals for $G_C G_{CR} CR$ and $G_C G_{CB} CB$ to the multiplier 14. The separation of resealed signals for the luminance and chrominance data is time synchronized to the component video data stream by control signals received from the controller 30.

The recombiner 28 interleaves signals for Y', CR', and CB' to produce an output sequence with the same order as the original sequence of component video data. For example, the recombiner 28 produces the output sequence $CB'_1, Y'_1, CR'_1, Y'_2$, which is in the same order as the input sequence $CB_1, Y_1, CR_1, Y_2$. The temporal interleaving is synchronized to the arrival of transformed component video data Y', CR', CB' from the adder 22 and summing logic 26 by control signals received from the controller 30.

The summing logic 26 adds sequences of digital signals from the multiplier 14 to produce the transformed values CR' and CB'. Each sequence has the form:

$CRG_C G_{CR} \cos \phi$, $CRG_C G_{CR} \sin \phi$, $CBG_C G_{CB} \sin \phi$, $CBG_C G_{CB} \cos \phi$.

To synchronize an addition to the arrival of a new sequence of digital signals, the controller 30 sends control signals to the summing logic 26.

Figure 2:
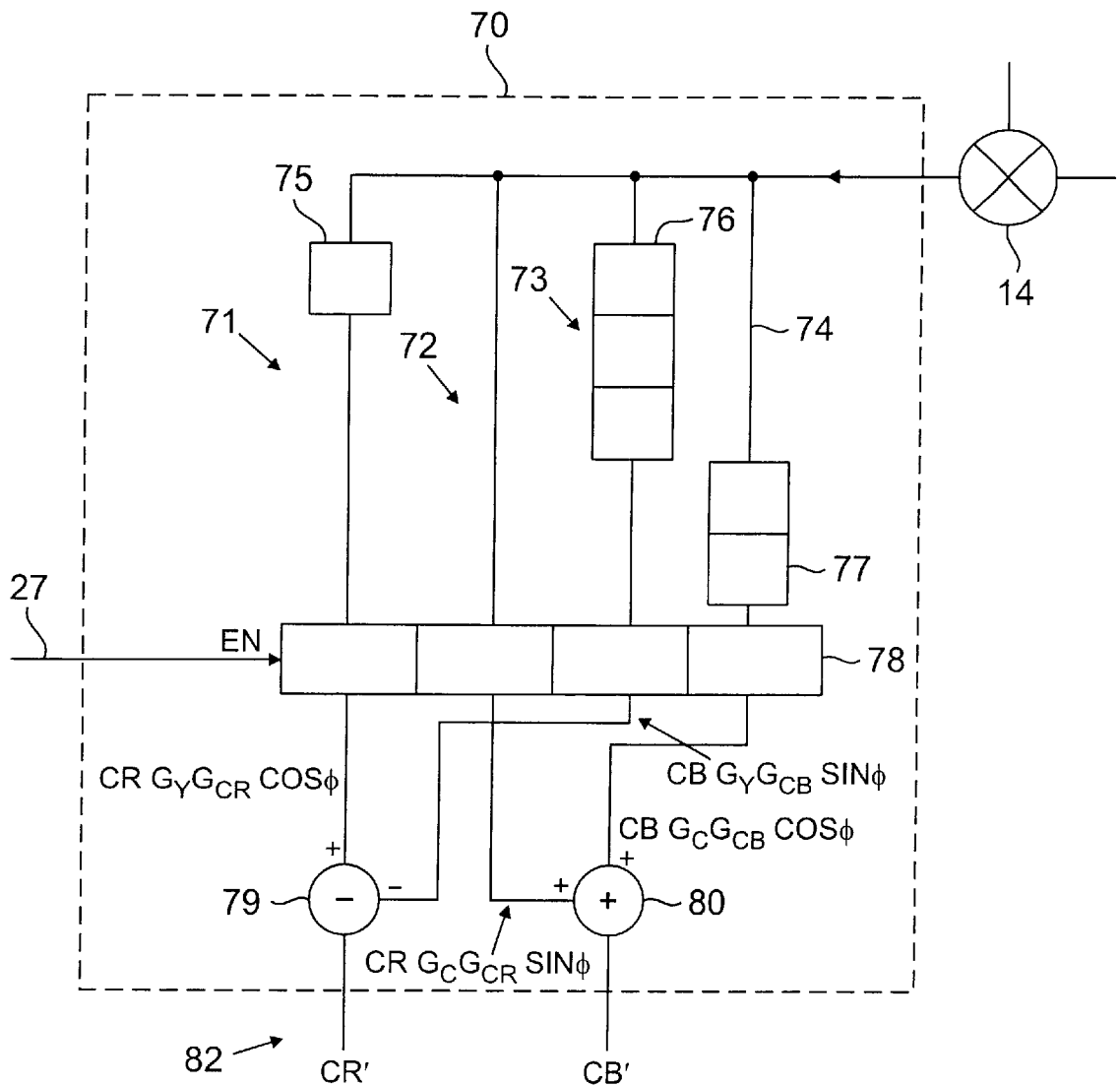
FIG. 2 shows one embodiment of the summing logic used in the digital procamp of FIG. 1.

FIG. 2 shows one embodiment 70 of the summing logic 26. The summing logic 26 sends serially received signals from the multiplier 14 to four parallel channels 71–74. The channels 71, 73, and 74 delay received signals by one, three, and two clock cycles, respectively. Sending the received signals through shift registers 75, 76, 77 of appropriate length, produces the delays. An output terminal of each channel 71–74 couples to a parallel input terminal of a register 78. Output terminals of the register 78 couple to a digital subtractor 79 and a digital adder 80.

The register 78 stores data from the channels 71–74 in response to control signals from the controller 30. The controller times the control signals so that the register 78 parallel loads new data in the aligned form:

$CRG_CG_{CR} \cos \phi$, $CRG_CG_{CR} \sin \phi$, $CBG_CG_{CB} \sin \phi$, $CBG_CG_{CB} \cos \phi$.

The control signals also cause the register 78 to transmit stored data to the subtractor 79 and adder 80 in parallel. The subtractor 79 and adder 80 generate signals for the transformed color differences CR' and CB' from the received data. The transformed values of CR' and CB' are sent to the recombiner 28, via line 82, at intervals of four clock cycles.

Referring again to FIG. 1, the procamp 10 uses two digital multipliers 12, 14 to perform the multiplications needed to transform serially received component video data. Digital multipliers are expensive and consume relatively high amounts of power. Since the procamp 10 only uses two digital multipliers 12, 14, the procamp 10 may offer substantial cost and/or power savings over conventional procamps using larger numbers of digital multipliers. Some prior art devices may use as many as seven digital multipliers, as described above.

Figure 3:
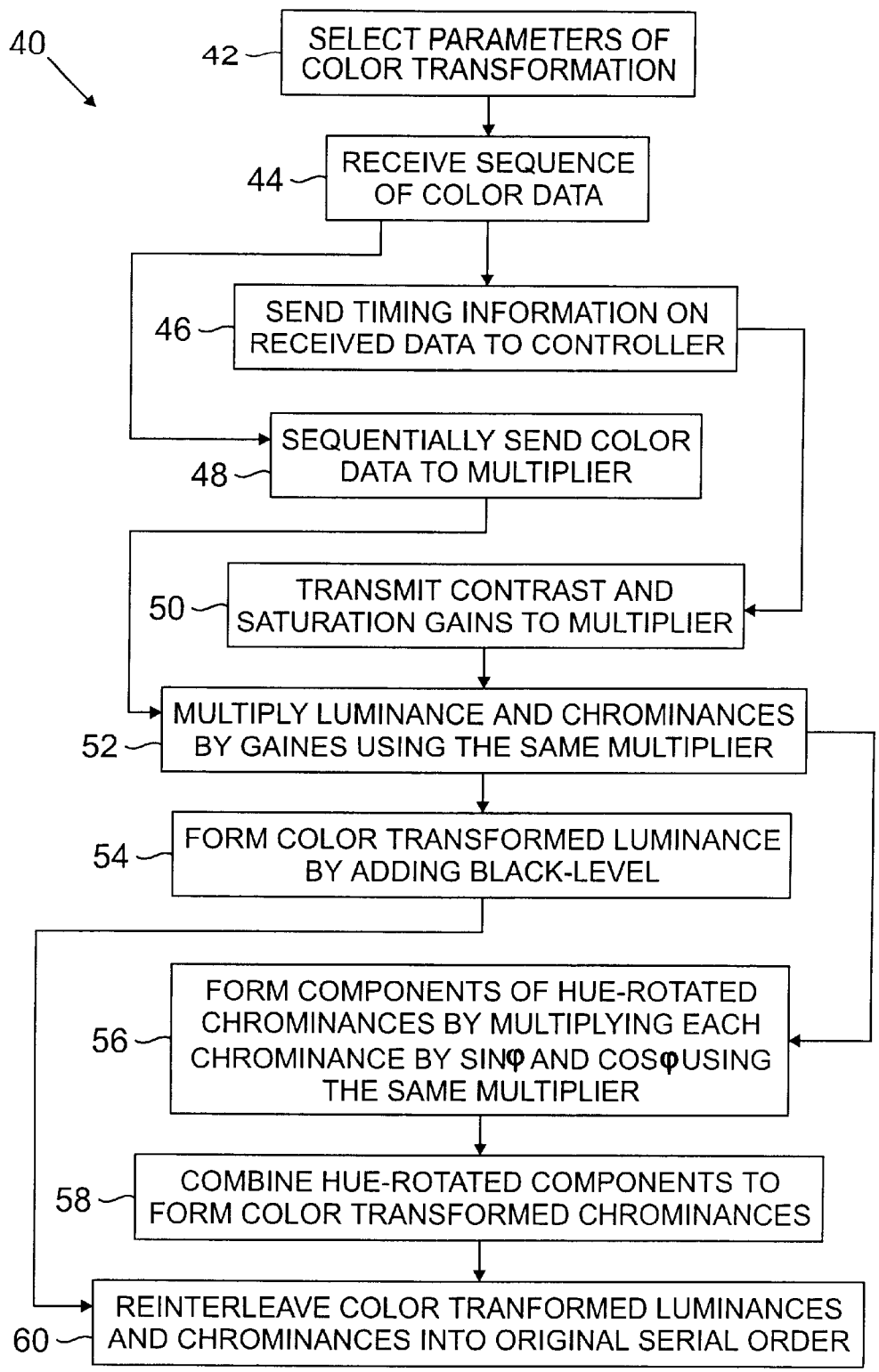
FIG. 3 is a flow chart showing one embodiment of a method of operating the procamp of FIG. 1.

FIG. 3 is a flow chart showing a method 40 of color transforming component video data with the procamp 10 of FIG. 1. Prior to performing a color transform, a user or external device selects values for the contrast and chrominance gains $G_Y$, $G_C$; color difference signal gains $G_{CR}$, $G_{CB}$; black level B; and hue rotation angle o that define the transformation (step 42). The user may set the values of these parameters interactively while viewing an image produced by the present values of the parameters. Viewing the image provides feedback for determining better parameter selections.

The procamp 10 receives the component video data sequentially and interfaces the data via input buffer 16 (step 44). The input buffer 16 sends timing information to the controller 30 (step 46). From the timing information, the controller 30 determines the clock cycle in which the multiplier 12 will receive each piece of component video data, e.g., Y, CR, and CB, in a stream from the input buffer 16. The input buffer 16 may generate the timing information in response to receiving a reference ID header for the arriving data stream as long as the serial format of the arriving data stream is known.

The input buffer 16 sends associated values of the component video data, e.g., $CB_1$, $Y_1$, $CR_1$, $Y_2$, to the multiplier 12 sequentially (step 48). Each piece of component video data is transmitted in a separate clock cycle.

Figure 4:
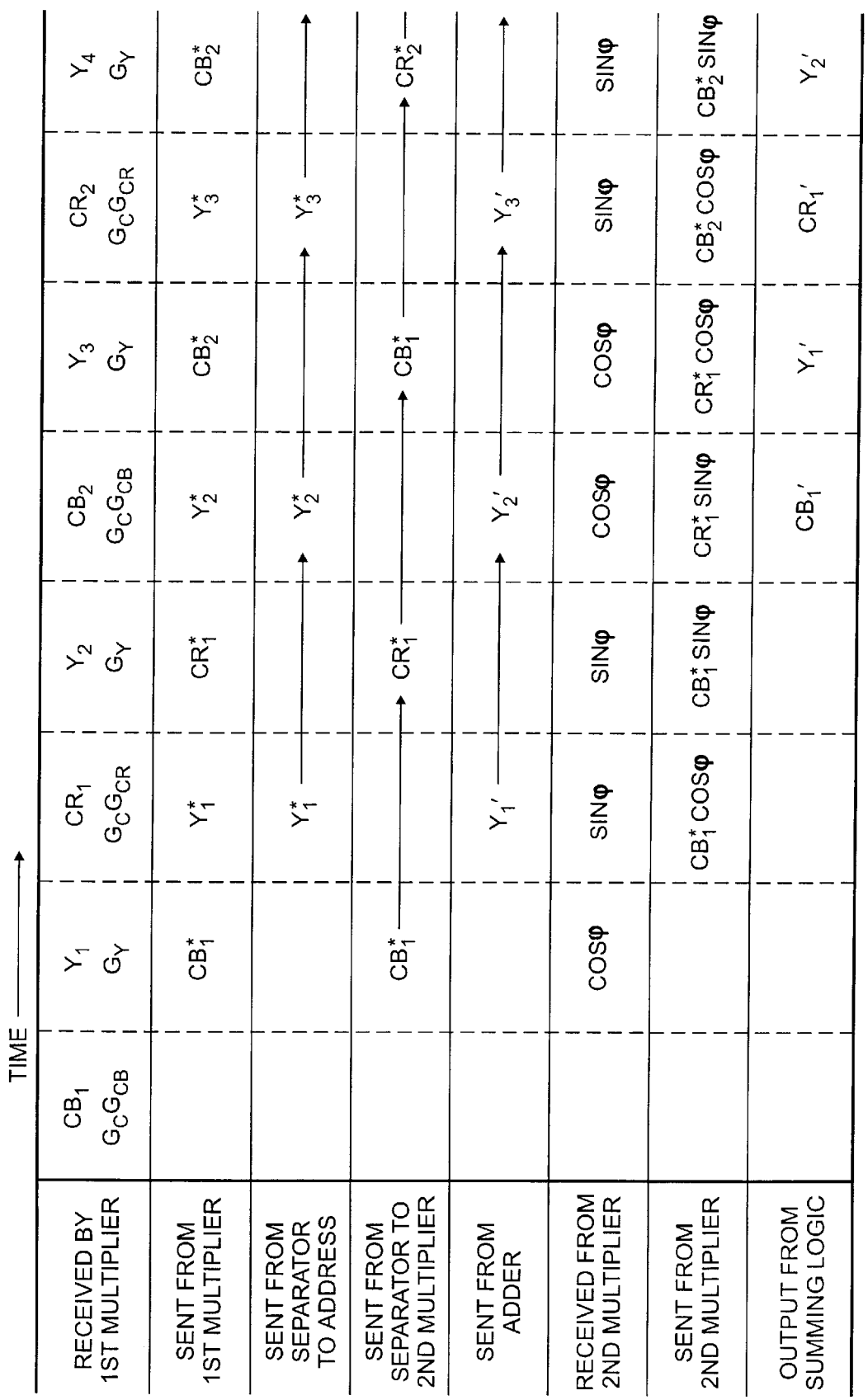
FIG. 4 is a timing diagram that illustrates signal values in the procamp of FIG. 1.

The controller 30 uses the timing information to synchronize transmissions of inputterminal select signals to the multiplexer 18 with arrival of data stream at the multiplier 12. The select signals synchronize the transmission of the gains $G_Y$, $G_CG_{CR}$, and $G_CG_{CB}$ and the transmission of the component video data to the multiplier 12 (step 50). The multiplier 12 multiplies each piece of component video data Y, CR, and CB by the gain appropriate to the selected transformation (step 52). The multiplications produce a rescaled data stream $G_CG_{CB}CB_1$, $G_YY_1$, $G_CG_{CR}CR_1$, $G_YY_2$ from the original data stream $CB_1$, $Y_1$, $CR_1$, $Y_2$ as shown in FIG. 4.

Henceforth, the rescaled component video data $G_CG_{CR}CR$, $G_CG_{CR}CB$, $G_YY$ is referred to as CR*, CB*, and Y*.

The multiplier 12 transmits the rescaled component video data, i.e., Y*, CR*, and CB*, to the separator 20. The separator 20 separates the signals for the rescaled luminances and color difference signals as shown in the timing diagram of FIG. 4. The signals for the rescaled luminance are sent to the adder 22. The signals for the rescaled color differences are sent to the multiplier 14. The adder 22 adds the black level B to the rescaled luminance Y* to produce the transformed luminance Y' (step 54). The multiplier 14 multiplies each rescaled color difference by the hue-rotation factors $\cos \phi$ and $\sin \phi$ to obtain the four components of the hue-rotated color difference signals (step 56). This multiplication produces a sequence of signals for CR*cos $\phi$, CR*sin $\phi$, CB*sin $\phi$, CB*cos $\phi$ as shown in the timing diagram of FIG. 4. The summing logic 26 adds the signals from the multiplier 14 to produce the transformed values of the color differences CR' and CB' (step 58).

The adder 22 and summing logic 26 transmit the transformed component video data, e.g., the data $Y'_1$, $Y'_2CR'_1$, and $CB'_1$ to the recombiner 28. The recombiner 28 re-interleaves the transformed luminance and color difference data to produce serial output data with the original order in which the data was received at the input buffer 16 (step 62). For example, the output data has the order $CB'_1$, $Y'_1CR'_1$, $Y'_2$ ... if the input data had the order $CB_1$, $Y_1$ $CR_1$, $Y_2$ ....

In other embodiments, the multipliers 12, 14; adder 22; and summing logic 26 may use different lengths of time to perform calculations. These differences can change the form of the timing diagram of FIG. 4.

Figure 5:
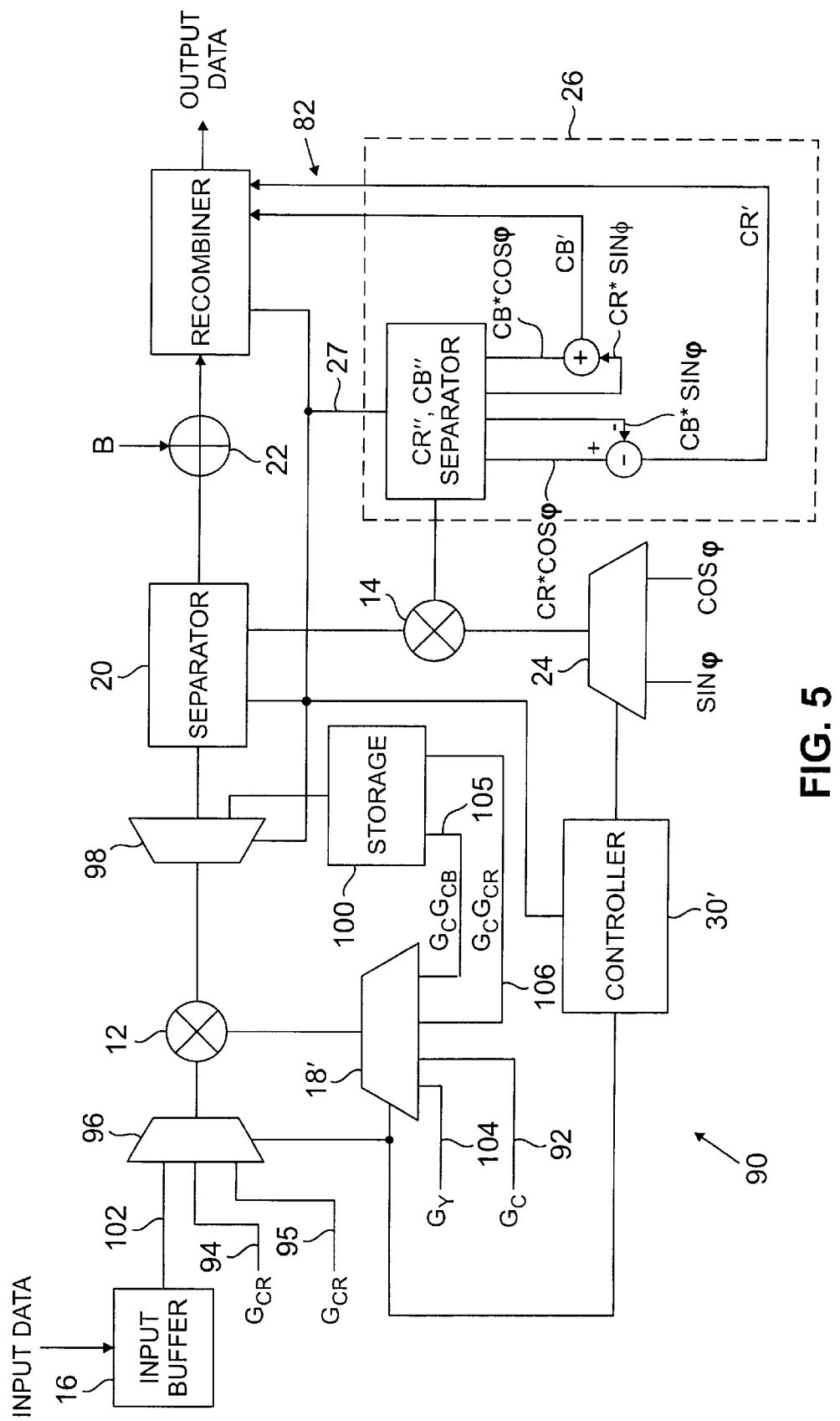
FIG. 5 is a circuit diagram for another embodiment of a digital procamp.

FIG. 5 shows another embodiment of a digital procamp 90, which has both precalculation and operating modes. During the precalculation mode, the procamp generates and stores the saturation gains $G_CG_{CR}$ and $G_CG_{CB}$ from user-selected values of the gains $G_C$, $G_{CR}$, and $G_{CB}$ using multiplier 12. During the operating mode, the procamp 90 transforms serially received component digital video data streams using the contrast and saturation gains $G_Y$, $G_CG_{CR}$, and $G_CG_{CB}$.

In the precalculation mode (e.g., during H or V blanking time), control signals from the controller 30' select the input terminal 92 of MUX 18' and input terminal 94 and 95 of MUX 96. For this selection, the multiplier 12 receives signal pairs $G_C$, $G_{CR}$ and $G_{CG}$, $G_{CB}$; and generates the saturation gains $G_CG_{CR}$ and $G_{CGCB}$ therefrom. The values of the saturation gains are sent to a storage device 100 via a signal router 98, which is also controlled by the controller 30. The saturation gains stored in the device 100 are available on lines 105, 106.

In the operating mode, control signals from the controller 30' select input terminal 102 of the multiplexer 96 and input terminals 104-106 of the multiplexer 18'. For these selections, the multiplier 14 generates rescaled component video data, i.e., Y*, CR*, and CB* substantially in the same manner described in relation to FIGS. 1 and 3. The controller 30 also sends control signals so that the signal router 98 connects the output terminal from the multiplier 14 to the separator 20. Then, the remainder of the procamp 90 operates similarly to the procamp 10 of FIG. 1 and produces transformed data from the input data.

Since the procamp 90 does not transform component video data during blanking, the procamp may be programmed to reduce interference with the processing of component video data by performing precalculation operations when component video data is unavailable. To achieve this goal, the precalculation mode may be run outside of the normal active picture area. Such periods occur in H and V blanking input regions of the signal, for example between the EAV and SAV code timing points.

Other embodiments are within the scope of the following claims

What is claimed is:

1. A procamp to tranform component digital video data, comprising:

a first digital multiplier coupled to receive component digital video data corresponding to at least two different pixel parameters, and configured to selectively multiply the component video data for the different pixel parameters by different factors, wherein the factors include two different gains, wherein the component video data include color data, and further comprising:

a second digital multiplier coupled to receive the color data produced by the first multiplier and configured to produce first and second new color data by multiplying each color datum received from the first multiplier by the sine and cosine of an angle, respectively, the angle defining a hue rotation of the color data.

2. The procamp of claim 1, further comprising:

a multiplexer having input terminals coupled to sources of the different factors and an output terminal coupled to the first multiplier.

3. The procamp of claim 2, further comprising:

a controller coupled to cause the multiplexer to transmit first and second ones of the factors in synchronization with the component video data for first and second pixel parameters being received at the first multiplier.

4. The procamp of claim 3, wherein the factors include at least contrast and saturation gains.

5. The procamp of claim 3, further comprising:

a buffer coupled to receive the component digital video data and to transmit the received data to the first multiplier.

6. A procamp to transform component digital video data, comprising:

a first digital multiplier coupled to receive component digital video data corresponding to at least two different pixel parameters, and configured to selectively multiply the component video data for the different pixel parameters by different factors, wherein the factors include contrast and color difference gains, wherein the component video data include color data, and further comprising:

a second digital multiplier coupled to receive the color data produced by the first multiplier and configured to produce first and second new color data by multiplying each color datum received from the first multiplier by the sine and cosine of an angle, respectively, the angle defining a hue rotation of the color data.

7. The procamp of claim 6, further comprising:

an adder coupled to receive the new color data and to produce color data with a new hue by adding the first and second new color data.

8. A procamp to transform component digital video data, comprising:

a first digital multiplier coupled to receive component digital video data corresponding to at least two different pixel parameters, and configured to selectively multiply the component video data for the different pixel parameters by different factors, wherein the factors include contrast and color difference gains, further comprising:

an adder to add a black-level offset to a first portion of the received component video data;

a second digital multiplier coupled to receive a second portion of the component video data produced by the first multiplier, said second portion comprising first and second color data, said second digital multiplier being configured to produce first and second new color data by multiplying the color datum received from the first multiplier by first and second hue factors, respectively; and a separator coupled to receive the component video data from the first multiplier and to send said first portion from the first multiplier to the adder and to send said second portion received from the first multiplier to the second multiplier.

9. A method of transforming a sequence of component digital video data, comprising;

receiving the sequence of the component video data, the component video data of the sequence corresponding to at least two different pixel parameters;

sequentially transmitting the received data to a digital multiplier; and multiplying each transmitted datum by a preselected factor in the multiplier, further comprising;

temporally interleaving the two different gains to the multiplier to perform the acts of multiplying further comprising:

sending a portion of the sequence from the first digital multiplier to a second digital multiplier; and producing first and second data components from each datum of the portion by multiplying at the second digital multiplier to multiply each sent datum by first and second new digital factors, the new digital factors being a sine and a cosine of a hue rotation angle.

10. The method of claim 9, further comprising:

producing transformed digital color difference data by summing pairs of the produced data components.

11. A method of changing contrast and saturation levels of serially streaming component digital video data, comprising:

receiving a sequence of the component digital video data;

sequentially sending the component video data to a digital multiplier; and multiplying the component video data by contrast and saturation gains in the digital multiplier, further comprising:

sending a portion of the data of the sequence from the first digital multiplier to a second digital multiplier; and producing first and second digital data components from each datum of the portion by multiplying each sent datum by first and second new digital factors in the second multiplier, the new factors being a sine and a cosine of an angle.

12. The method of claim 11, further comprising:

producing transformed digital color difference data by summing pairs of the produced data components.

* * * * *